(12) United States Patent
Brinker et al.

(10) Patent No.: US 11,149,601 B2
(45) Date of Patent: Oct. 19, 2021

(54) OIL SEPARATOR HAVING FIRST AND SECOND GAS INLETS AND GAS OUTLETS

(71) Applicant: REINZ-DICHTUNGS-GMBH, Neu-Ulm (DE)

(72) Inventors: Sebastian Brinker, Neu-Ulm (DE); Christoph Erdmann, Ulm (DE); Francesco Zitarosa, Illertissen (DE)

(73) Assignee: 3NINE AB, Nacka Strand (SE)

( * ) Notice: Subject to any disclaimer, the term of this patent is extended or adjusted under 35 U.S.C. 154(b) by 498 days.

(21) Appl. No.: 16/304,787

(22) PCT Filed: May 26, 2017

(86) PCT No.: PCT/EP2017/062728
§ 371 (c)(1),
(2) Date: Nov. 27, 2018

(87) PCT Pub. No.: WO2017/203025
PCT Pub. Date: Nov. 30, 2017

(65) Prior Publication Data
US 2020/0300135 A1    Sep. 24, 2020

(30) Foreign Application Priority Data

May 27, 2016 (DE) .................... 20 2016 102 827.2

(51) Int. Cl.
| | |
|---|---|
| *F01M 13/04* | (2006.01) |
| *B01D 45/14* | (2006.01) |
| *B04B 5/00* | (2006.01) |
| *B04B 5/12* | (2006.01) |
| *B04B 9/02* | (2006.01) |
| *B04B 11/02* | (2006.01) |

(52) U.S. Cl.
CPC ............ *F01M 13/04* (2013.01); *B01D 45/14* (2013.01); *B04B 5/005* (2013.01); *B04B 5/12* (2013.01); *B04B 9/02* (2013.01); *B04B 11/02* (2013.01); *B04B 2005/125* (2013.01); *F01M 2013/0422* (2013.01)

(58) Field of Classification Search
CPC .......... F01M 13/04; F01M 2013/0422; B01D 45/14; B04B 5/005; B04B 5/12; B04B 9/02; B04B 11/02; B04B 2005/125; B04B 5/00
USPC .......... 123/196, 572; 55/400, 410, 411, 418, 55/419
See application file for complete search history.

(56) References Cited

U.S. PATENT DOCUMENTS

| | | | | |
|---|---|---|---|---|
| 5,507,268 A | * | 4/1996 | Schlattl ................ | F16N 39/002 123/572 |
| 2010/0180854 A1 | * | 7/2010 | Baumann ................ | B04B 5/005 123/196 A |

FOREIGN PATENT DOCUMENTS

| | | |
|---|---|---|
| DE | 19520533 | 3/1996 |
| DE | 10044615 | 4/2002 |
| DE | 69931563 | 5/2007 |
| DE | 202007009913 | 11/2008 |

(Continued)

OTHER PUBLICATIONS

European Patent Office, International Search Report with Written Opinion issued in PCT/EP2017/062728, dated Aug. 22, 2017, 19 pages, European Patent Office, Rijswijk, Netherlands.

*Primary Examiner* — Walter D. Griffin
*Assistant Examiner* — Shuyi S. Liu
(74) *Attorney, Agent, or Firm* — Mark P. Stone (57) ABSTRACT

An oil separator for separating oil droplets and/or oil mist from gases, in particular from blow-by gases of an internal combustion engine is described.

13 Claims, 8 Drawing Sheets

(56) References Cited

FOREIGN PATENT DOCUMENTS

| | | |
|---|---|---|
| DE | 102007054922 | 1/2009 |
| DE | 112012004612 | 9/2014 |
| DE | 202014006149 | 7/2015 |
| DE | 202014010065 | 1/2016 |
| DE | 202015103420 | 6/2016 |
| DE | 202016102827 | 9/2017 |
| EP | 1473110 | 11/2004 |
| EP | 2558690 | 2/2013 |
| EP | 2939747 | 11/2015 |
| WO | 2016050255 | 4/2016 |

* cited by examiner

OIL SEPARATOR HAVING FIRST AND SECOND GAS INLETS AND GAS OUTLETS

BACKGROUND

The present invention relates to an oil separator for separating oil droplets and/or oil mist from gases, in particular from blow-by gases of an internal combustion engine.

Oil separators of this type are formed for example as centrifugal separators having disc separators, in which a gas within a chamber of a stationary housing is set in rotation by means of a rotor. The oil droplets and the oil mist are flung outwards owing to the centrifugal force which occurs and thereby separated on impact surfaces. To set the gas in rotational motion, an oil separating element is used, for example, which can be designed as similarly configured frustoconical plates. The gas to be cleaned is now guided centrally or from the periphery, into the clearances between the individual plates of the stack and carried along there owing to a rotational motion of the stack and the plates of up to 15,000 RPM. During this, separation of the oil droplets and the oil mist takes place on the plates and on the housing wall of the oil separator. The oil separating element is normally set in rotation by a drive element via a shaft, which is in turn driven by means of the oil pressure of the internal combustion engine or electrically.

Oil separators of this type are used in particular for separating oil mist and oil droplets from blow-by gases of internal combustion engines.

However, the gas flows which can be managed by an active oil separator of this type in the event of a limited pressure drop across the oil separator are limited. In particular, gas flows which are to be conducted through an oil separator of this type, in particular through the clearances between the individual discs of the disc separator, cannot be increased as desired. Therefore, in the event of high gas flows to be cleaned, in particular high blow-by gas flows, these can no longer be adequately discharged or cleaned of oil mist and/or oil drops.

SUMMARY

It is therefore the object of the present invention to provide an oil separator, for example of the type above, which has high operational reliability and good separating behaviour, even in the case of high gas flows.

This object is achieved by the oil separator according to Claim 1.

Advantageous further developments of the oil separator according to the invention are described in the respective dependent claims.

The oil separator according to the invention serves for separating oil droplets and/or oil mist from gases, in particular from blow-by gases of an internal combustion engine.

The oil separator has a housing in which a rotor is arranged. The rotor in turn has a shaft and an oil separating element which is arranged on the shaft and is rotatable therewith. In this case, the oil separating element can be a plate stake, as described above, to which the gas to be cleaned is supplied substantially centrally via a bore in the shaft or in another manner parallel to the shaft. If the oil separating element, in particular a plate stack, is set in rotation, the gases to be cleaned are thereby set in tangential and radial motion, for example in that the gases to be cleaned flow through the clearances between the individual plates of the plate stack. As a result of this, a separation of the oil droplets and the oil mist ultimately takes place on the plates and on the walls of the housing which surround the rotor.

The supply of the gas to be cleaned to the oil separating element takes place for example via a first gas inlet along the shaft, i.e. in particular through grooves or bores in the shaft, which extend substantially in the axial direction of the shaft, at least in sections. It is likewise possible for the gas to be cleaned to be supplied to the clearances between the plates of the plate stack along the shaft outside the shaft. To this end, the plates of the plate stack normally have openings adjoining the shaft or adjacent to the shaft, which enable a stream parallel to the axial direction of the shaft.

The wall of the housing which surrounds the rotor and the oil separating element has a first gas outlet, through which the gas which is cleaned of the oil mist and/or the oil droplets can exit the housing. In the case of blow-by gases, the cleaned gases are normally conducted back into the intake tract of the internal combustion engine.

The first gas inlet, the through-opening in the oil separating element and the shaft, in particular the clearances between plate stacks of disc separators, and the second gas outlet restrict the flow of gas to be cleaned through the oil separator and define the pressure difference between the first inlet and the first outlet.

According to the invention, it is now provided that a second gas inlet is arranged in the wall of the housing which surrounds the rotor, via which gas inlet the gases to be cleaned can be additionally introduced into the clearance between the rotor and the housing.

In contrast to conventional bypass solutions for oil separators, in addition to the gas to be cleaned which flows through the rotor, further gas to be cleaned is introduced into the separating chamber. Although this gas does not flow through the oil separating element itself and is therefore not subject to oil-droplet or oil-mist separation by means of this oil separating element, it is itself likewise set in rotation by the rotation of the rotor and by the rotation of the gas flow exiting the rotor so that this gas which is introduced into the housing of the rotor through the second gas inlet undergoes separation of oil droplets and/or oil mist on the wall of the housing. The mixed, cleaned gas is subsequently discharged from the housing via the first gas outlet.

The oil separator according to the invention can advantageously also have a second gas outlet, which is arranged in the housing. It is thus possible, in the case of very high volume flows, to also discharge these volume flows reliably from the separating chamber within the housing.

It is particularly advantageous if one or both additional throughflow options, namely the second gas inlet and/or the second gas outlet, are each closed by a valve which has a specific opening characteristic. In this case, the respective valve can be set so that it only opens when a specified input volume flow (for the second gas inlet) is exceeded or when a specified output volume flow (for the second gas outlet) is exceeded or when a specified pressure difference between the gas on the pressure side of the respective valve and the suction side of the respective valve is exceeded.

An opening characteristic of this type can be realised in that the first valve and/or the second valve is controlled by means of the motor control or an actuator, for example a servomotor, an actuating element or a pressure sensor.

The first and second gas inlet and the first and second gas outlet can each be connected outside the housing to a common gas supply line or gas discharge line. Therefore, for example, a common ventilation line can lead both to the first gas inlet and to the second gas inlet. Furthermore, a common line can lead from the first gas outlet and second gas outlet to the intake tract of an internal combustion engine.

The first and/or the second valve can be formed on the one hand as a mushroom valve whereof the valve disc is advantageously made from an elastomer material or contains this. To this end, to open the valve, the outer edge of the valve disc can then bend away from the valve seat and thereby free a gap between the valve disc and the valve seat.

It is also possible to form the first valve and/or the second valve as a valve closure having a movable spring tongue or a movable spring shim.

For this, a movable spring tongue or a movable spring shim can be arranged adjacent to the valve opening and can cover the valve opening completely in the closed state of the valve. In the case of a spring tongue, the lifting away movement takes place advantageously laterally, whilst, in the case of a spring shim, a centrally arranged region preferably frees the cross-section. Whilst, in the case of spring tongues, connections are in particular provided via one or two holding arms, for example two mutually parallel holding arms, in the case of spring shims which lift away centrally, two, three or even more holding arms are preferably provided.

In an embodiment which is particularly easy to produce, the spring tongue or the spring shim can be made from flexible sheet metal, in particular spring steel.

For valve tongues or shims of this type, it is advantageous if the side facing the valve opening is coated with a closed-cell elastomer material, at least in sections along the circumferential edge of the valve opening. This can be realised particularly effectively if the valve opening has an edge which protrudes beyond its surrounding area and on which the valve tongue can lie. In the latter case, further efficient oil separation takes place on the spring tongue as the gases pass through the valve opening. The oil separation furthermore takes place particularly efficiently if the spring tongue is coated with a closed-cell elastomer material in the region in which it lies against the valve opening.

The spring tongue or the spring shim can in turn be mounted in different ways or have specific forms to produce a specific manner in which the spring tongue or the spring shim closes and opens the valve opening.

In particular, spring tongues or shims of this type can each have at least one holding arm which is resiliently secured on the valve body in such a way that the spring tongue or the spring shim is movable between a first position, in which it closes the gas passage opening covered thereby, and a second position in which it frees the gas passage opening covered thereby.

The spring tongue or spring shim can furthermore be pre-loaded in such a way that it closes the respectively covered gas passage opening below a specified positive pressure difference.

It is furthermore possible that the spring tongue or spring shim is movably mounted via at least one holding arm in such a way that it gradually frees or closes the valve opening. The pressure difference and the volume flow between the suction side and the pressure side of the valve can thus be set precisely. This enables the oil separator to be operated with an optimum size of all through-openings of the first and second gas inlets or the first and second gas outlets depending on the volume flow of the gases to be cleaned at an operating point.

For the spring tongue, the at least one holding arm can also be secured in such a way that the associated spring tongue, in a tilting motion, gradually moves away from, or gradually closes, one or more valve openings of one or more first valves (similarly also for one or more second valves). The pressure difference and the volume flow between the suction side and the pressure side of the first valves or the second valves can thus be set more precisely. This enables the present invention to operate the oil separator with an optimum number of opened/freed first valves (or second valves) depending on the volume flow of the gases to be cleaned at an operating point.

Alternatively to mushroom valves and spring tongues or shims, valve constructions having spiral springs can also be used; however, mushroom valves, spring tongues and spring shims are usually designed more simply and are therefore more cost-effective.

According to the invention, further gas inlets and/or gas outlets can also be provided, wherein the procedure described above for two gas inlets and/or two gas outlets in each case can then be realised for each further gas inlet and/or gas outlet or for all the gas inlets and/or gas outlets.

It is furthermore advantageous if, when a second inlet and a second outlet are present, these are arranged in the wall of the housing, substantially on opposite sides of the oil separating element. In this case, the gases to be cleaned which are introduced via the second inlet cover a maximum path and are hereby set in rotation and also cleaned along this path.

The second inlet and the second outlet can, however, also be arranged immediately adjacent relative to the direction of rotation of the rotor, whereby a more efficient bypass with a lower pressure loss is produced, although the separation of the gas guided in the bypass is very limited.

The second inlet and the second outlet can also be arranged at the same height or offset from one another relative to the axial direction of the shaft. In terms of the pressure loss, it is particularly advantageous if the second outlet is arranged in the vicinity of the first outlet.

The rotor of the oil separator is driven in particular by means of the shaft. In this case, the drive element can be a hydraulically driven drive element, in particular a Heron turbine or a Pelton turbine, or an electrically driven drive element.

The oil separator according to the invention is suitable in particular for cleaning blow-by gases in internal combustion engines, although it can also be used in other fields for removing oil from gases.

Several examples of oil separators according to the invention are given below. These examples each present a plurality of inventive features and advantageous features in combination. However, it is also possible for each one of the advantageous features presented therein to be realised and combined with the inventive features of the present invention individually. This is also possible for any combination of the advantageous features in the accompanying examples.

In the examples, identical and similar reference signs are used for identical and similar elements so that the explanation of said elements is possibly not repeated.

DETAILED DESCRIPTION

Figure 1:
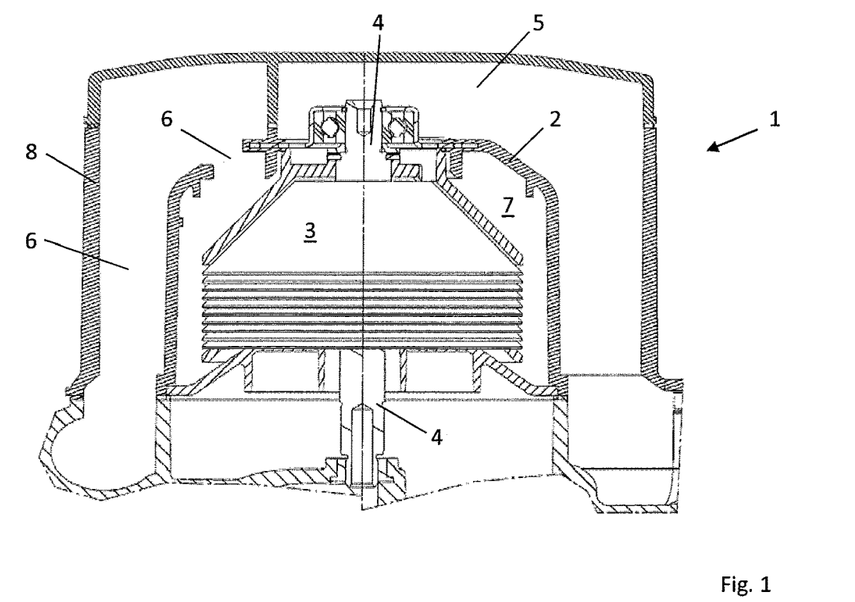
FIG. 1 an oil separator according to the prior art.

FIG. 1 shows an oil separator 1 according to the prior art. This oil separator 1 has a housing 2 which encloses an oil separating chamber 7. A rotor 3, which has a stack of plates arranged on top of one another, is arranged in the oil separating chamber 7. Clearances are located between the individual plates. The plate stack 3 is mounted on a shaft 4 and can be set in rotation by this shaft 4.

The housing 2 is surrounded by a further outer housing/wall 8, wherein both the gas supply and the transfer of the gleaned gas are arranged between the housing 2 and the outer housing 8.

Via a supply line 5, as a gas inlet, which is guided between the housing 2 and an outer wall 8, the gas, which is to be cleaned of oil mist and/or oil droplets, is supplied substantially centrally to the plate stack along the shaft 4. The gas then flows through between the individual plates of the plate stack 3 and exits these along their circumferential edge into the outer region of the oil separating chamber 7 in the region between the plate stack 3 and the wall of the housing 2. Owing to the rotation of the plate stack 3, the gas flowing through the plate stack 3 is set in rotation and accelerated so that oil mist and oil droplets are separated both on the surfaces of the plates and on the wall of the housing 2. They are subsequently collected in the lower region of the oil separating chamber 7 and discharged from the oil separating chamber 7 in a manner which is not illustrated. The cleaned gas then exits the oil separating chamber 7 via the gas outlet 6.

In the case of internal combustion engines, by means of an oil separator 1 of this type, blow-by gas, in particular, is introduced into the oil separator 1 from the crankcase via the gas inlet 5 and then supplied as cleaned blow-by gas to the intake tract of the internal combustion engine via the gas outlet 6.

In the case of very high blow-by gas volume flows, due transfer of the blow-by gas through the oil separator 1 cannot take place since the capacity thereof is limited by the cross-sections of the inlet 5, the clearances between the plates of the plate stack 3, the geometry of the housing 2 and the cross-section and the geometry of the outlet 6 with a given available pressure difference across the oil separator. The pressure difference across the oil separator is consequently inadmissibly high.

Conventionally, additional bypass lines are therefore provided around the oil separator 1, wherein oil separation and cleaning of the blow-by gas before it enters into the intake tract of the internal combustion engine do not take place, or only take place to a negligible extent.

Figure 2A:
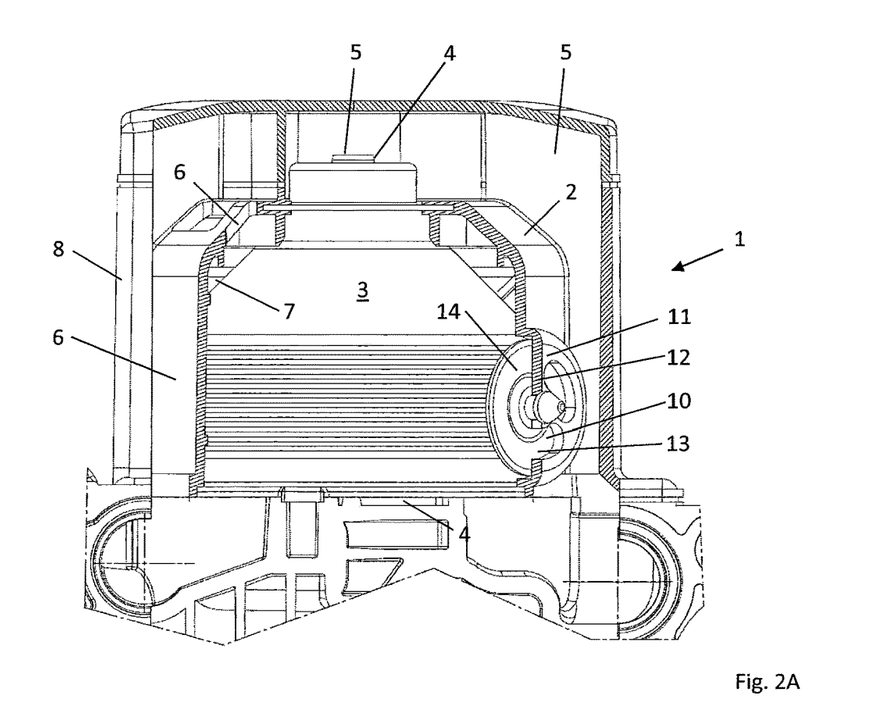
FIGS. 2-6 oil separators according to the present invention.

According to the invention, in the oil separator according to FIG. 2, a second gas inlet 10 into the oil separating chamber 7 is now arranged in the housing 2. This second gas inlet 10 has a mushroom valve 11 having a valve seat 12, a valve opening 13 and a valve disc 14 formed in the shape of a mushroom. In this case, FIG. 2A shows the valve in a sectional illustration.

When a specified volume flow or a specified pressure difference between the pressure side and the suction side (oil separating chamber 7) of the valve 11 is exceeded, the valve disc of the mushroom valve lifts away from the valve seat 12 and frees a passage between the supply line and the oil separating chamber 7. As a result, further gas can now flow into the oil separating chamber 7. This gas no longer flows through the clearances between the plates of the plate stack 3 but, owing to the rotation of the plate stack and the gas surrounding it, is carried along in a rotational motion along the inside of the wall 2 and thus likewise cleaned of oil droplets and oil mist. The mushroom valve at the same time serves as a non-return valve in order to prevent gas from flowing out of the oil separating chamber 7 via the second gas inlet 10.

In the oil separating chamber 7 between the rotor 3 and the wall of the housing 2, the gas flows, namely the gas flow which has flowed through the plate stack 3 and the gas flow which has entered the oil separating chamber 7 via the mushroom valve 11, consequently mix together and subsequently exit the oil separating chamber 7 via a gas outlet 6 of sufficiently large dimensions.

FIG. 2A shows an oil separator 1 with only a small volume flow of the gas to be cleaned, i.e. with a closed mushroom valve 11.

Figure 2B:
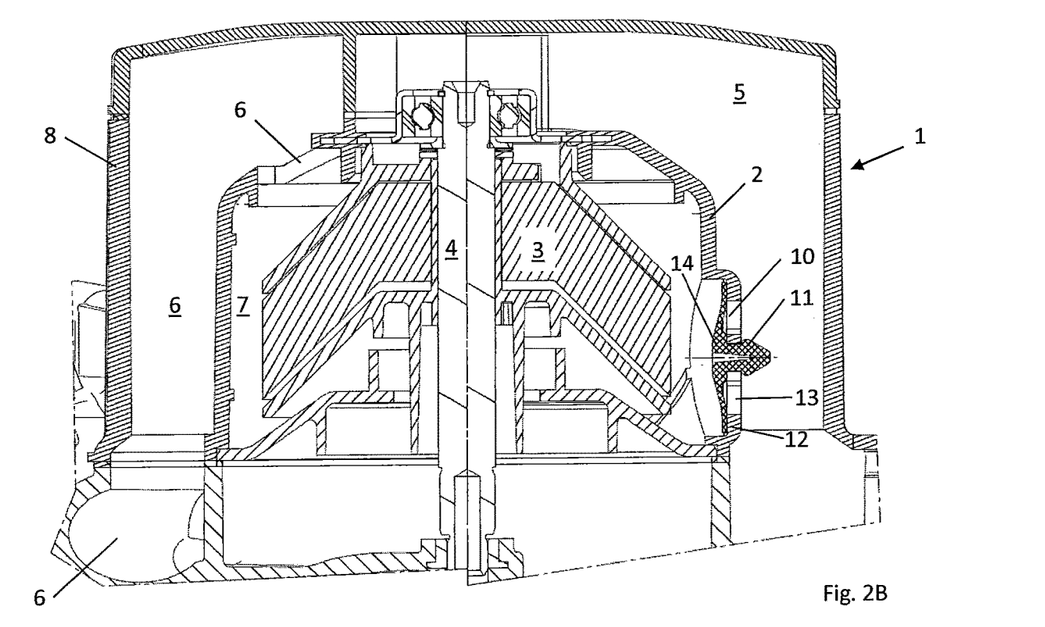

FIG. 2B shows a section through the oil separator 1 in the same state, wherein the mushroom valve 14 is now also shown in a sectional illustration here. In this case, as in the following FIGS. 2C to 5B, the plate stack 3 is only indicated schematically as a block.

Figure 2C:
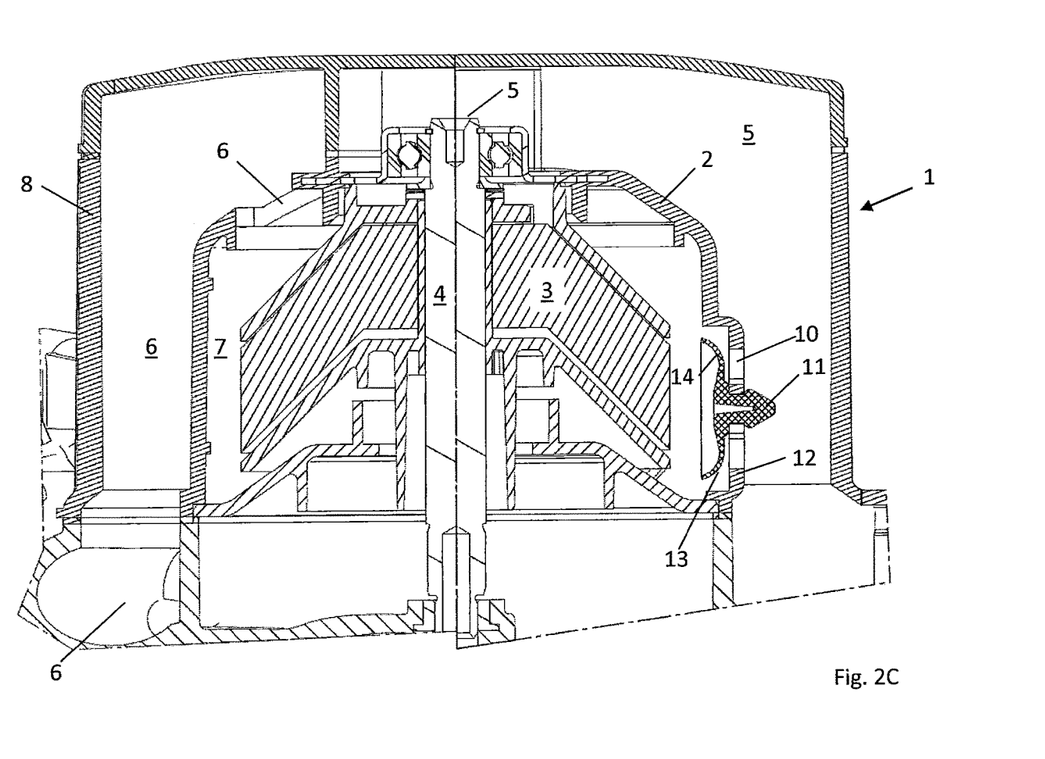

FIG. 2C shows the oil separator 1 with an open valve 11 in the case of a high volume flow of the gas to be cleaned.

FIG. 3 shows a further oil separator 1, which is formed in the same manner as that illustrated in FIG. 2.

However, the housing 2 additionally has a second gas outlet 20, which is configured as a mushroom valve 21. The mushroom valve 21 has a valve seat 22, a valve opening 23 and a valve disc 24 of an elastomer material.

The passage direction of the valve 11 leads from the inlet 5 into the oil separating chamber 7, whilst the opening direction of the valve 21 is directed from the oil separating chamber 7 into the gas line following the gas outlet 6. In this case, both mushroom valves are, at the same time, also non-return valves so that the valve 11 in any case prevents the flow of gas from the oil separating chamber 7 in the direction of the gas inlet and the mushroom valve 21 prevents the flow of cleaned gas into the oil separating chamber 7.

Figure 3A:
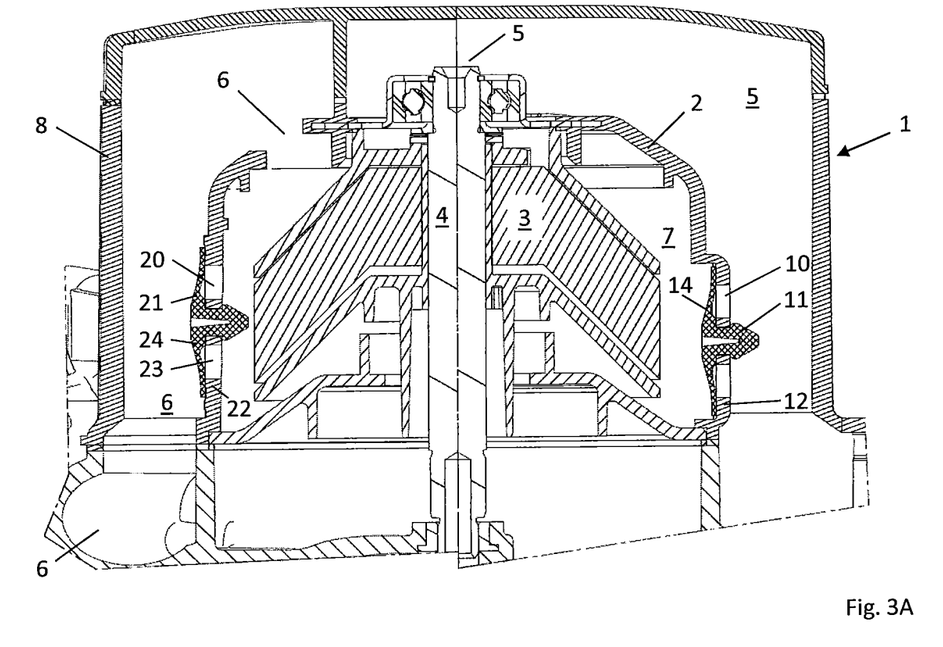

In FIG. 3A, both valves are closed with a low volume flow.

Figure 3B:
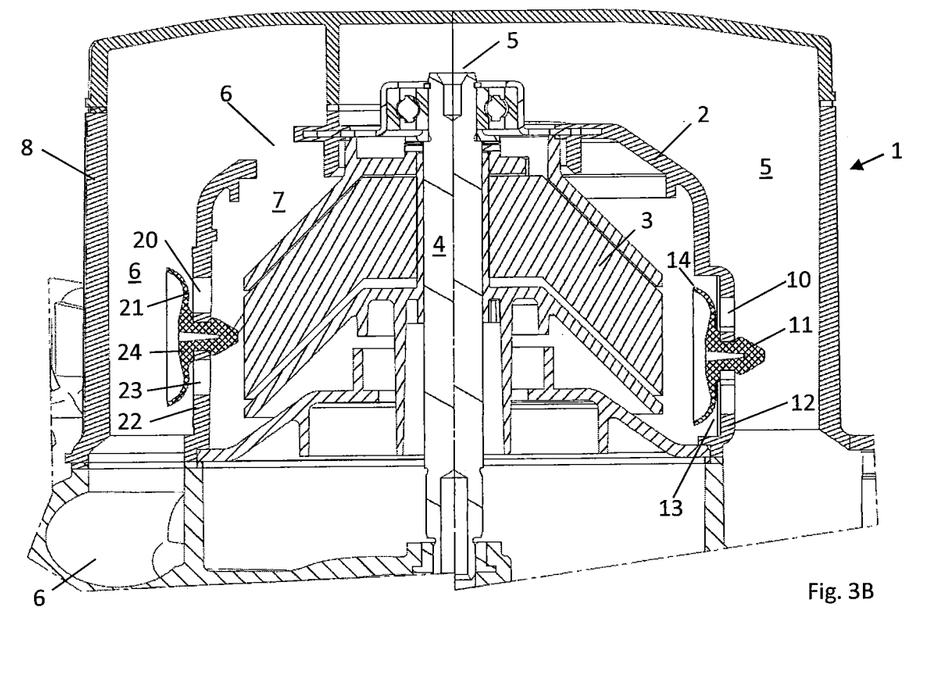

In FIG. 3B, both valves are open, i.e. in an operating point in which the volume flow of the gases to be cleaned is very high. In this case, the opening characteristic of the valves 11 and 12 can be similarly configured so that both valves open and close at the same time. Depending on requirements, however, it is also possible to provide both valves 11 and 12 with different opening characteristics. The same applies to the closing characteristics of the valves 11 and 21.

Figure 3C:
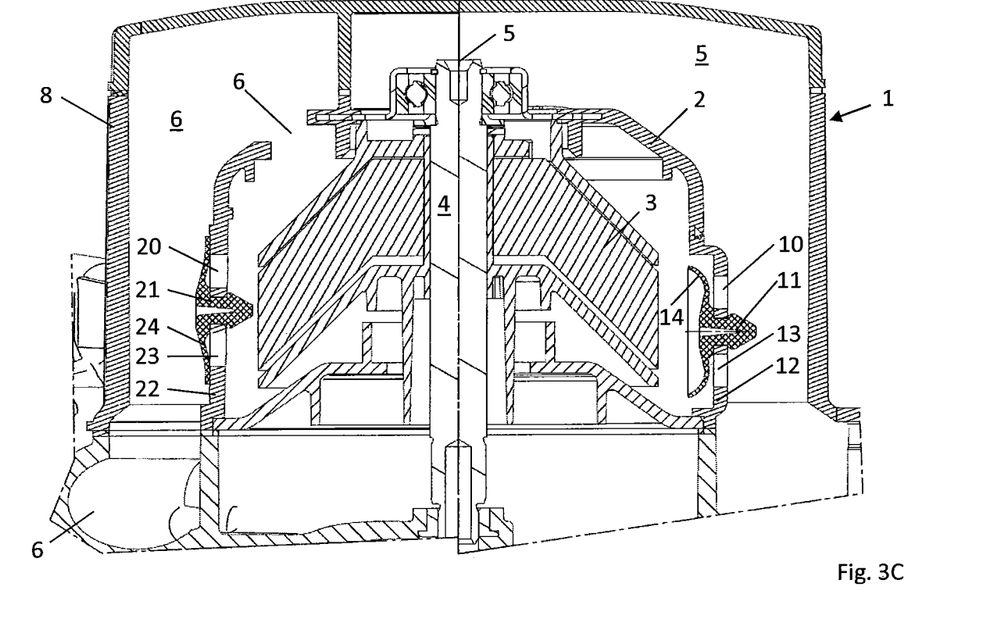

Therefore, in FIG. 3C for example, a state is illustrated in which the second outlet valve 21 is closed whilst the second inlet valve 11 is opened via the valve opening.

Figure 3D:
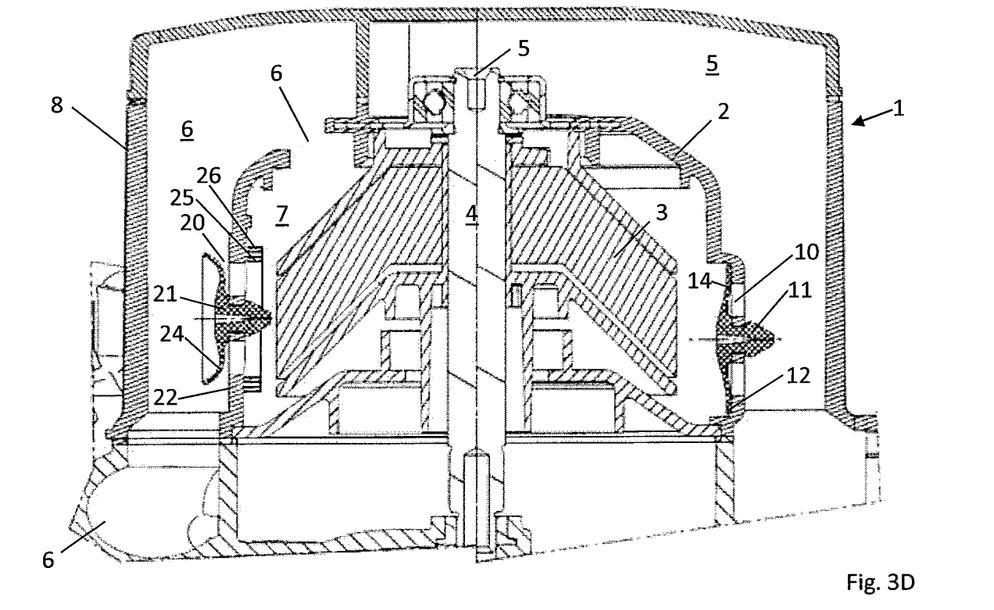

In FIG. 3D, a state is illustrated in which the second outlet valve 21 is open whilst the second inlet valve 11 is now closed. Such different opening and closing characteristics of the valves 11 and 21 can be set via a suitable material choice and configuration of the valves.

The states illustrated in FIGS. 3C and 3D can be realised for example when the inflow into the first gas inlet via the supply line 5 is limited or blocked (FIG. 3C) or when the discharge flow through the first gas outlet is limited or blocked (FIG. 3D), for example if local freezing occurs.

In contrast to the embodiments shown in FIGS. 3A to 3C, a further two collars 25, 26 extending circumferentially around the second gas outlet 20 on the inside of the housing 2 have been added in FIG. 3D, which collars, as a type of labyrinth seal, help to prevent the entrainment of oil as gas passes through the gas outlet 20 and out of the area surrounding the gas outlet 20. Comparable collars can also be attached around the second gas inlet opening 10 on the outside of the housing 2 in order to prevent the entrainment of oil which is separated when it impacts against the housing 2. However, a separate illustration has been omitted here.

Figure 4A:
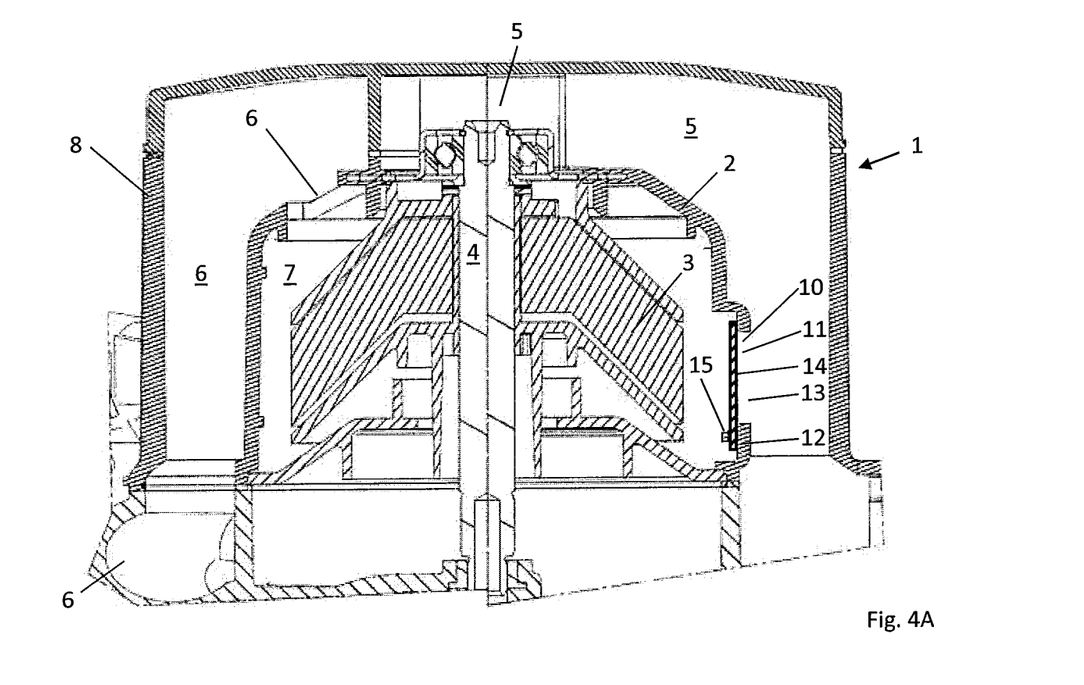
Figure 4B:
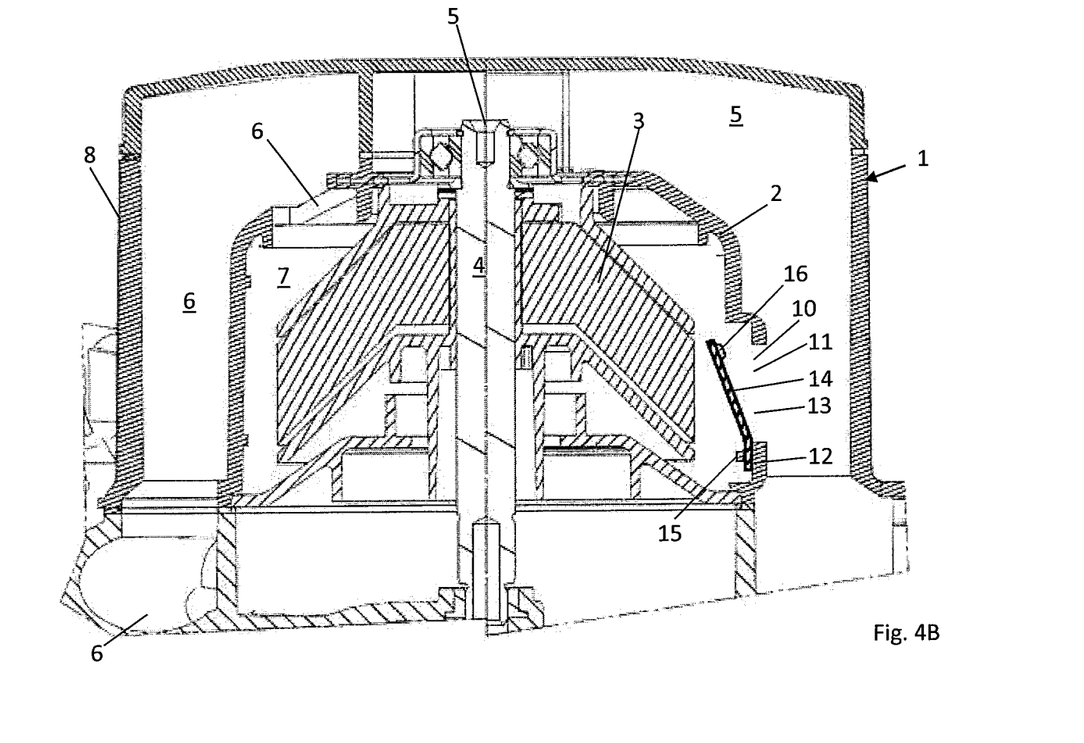

In two partial FIGS. 4A and 4B, FIG. 4 shows a further oil separator according to the invention, which is configured in the manner of the oil separator in FIG. 2. In contrast to FIG. 2, however, the second gas inlet 10 is now provided with another valve construction 11. As the valve 11, a valve opening 13 is provided within a valve seat 12 here, which valve opening can be closed and opened via a flexible spring tongue 14. The spring tongue is secured, for example screwed or riveted, to a support 15 as a securing point on the valve seat 12. In this case, the opening characteristic of the spring tongue 14 can be set via the choice of material thickness, material, geometric form of the transition between the securing point 15 and the free end of the spring tongue 14 and further parameters. It can be advantageous if the side of the spring tongue 14 which faces the valve opening 13 is coated with a closed-cell elastomer material 16, as illustrated in FIG. 4B. In this case, a particularly high oil separating capacity is realised on this spring tongue 14 when gas flows through the opening gap between the valve seat 12 and the spring tongue 14. Instead of the partial coating illustrated, a full surface coating is also possible, or the spring tongue 14 can be produced from spring hard sheet metal with a full surface elastomer coating, at least on the side facing the valve seat 12.

Figure 5A:
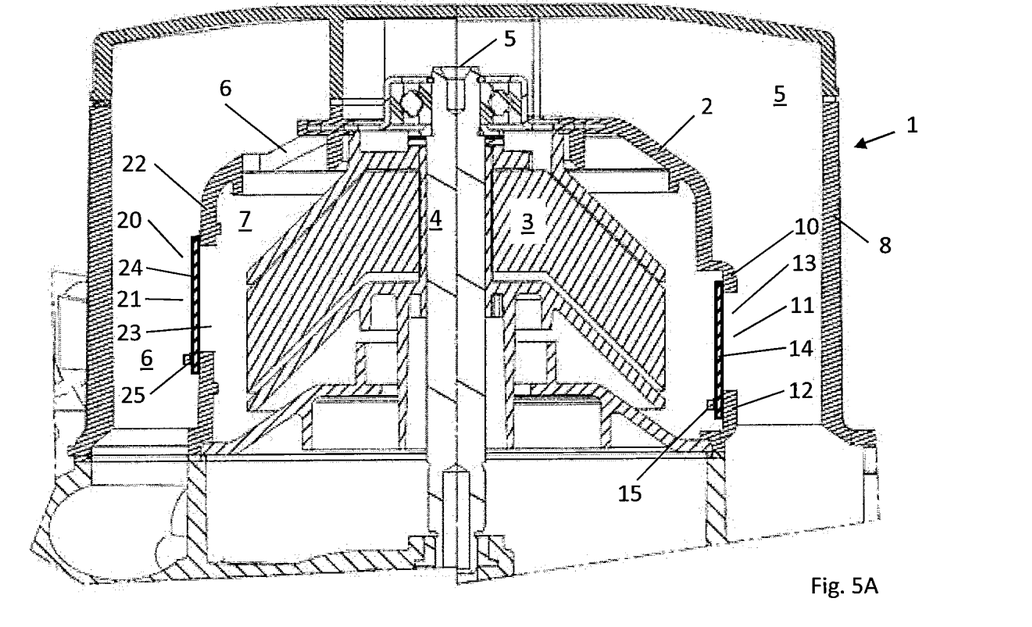
Figure 5B:
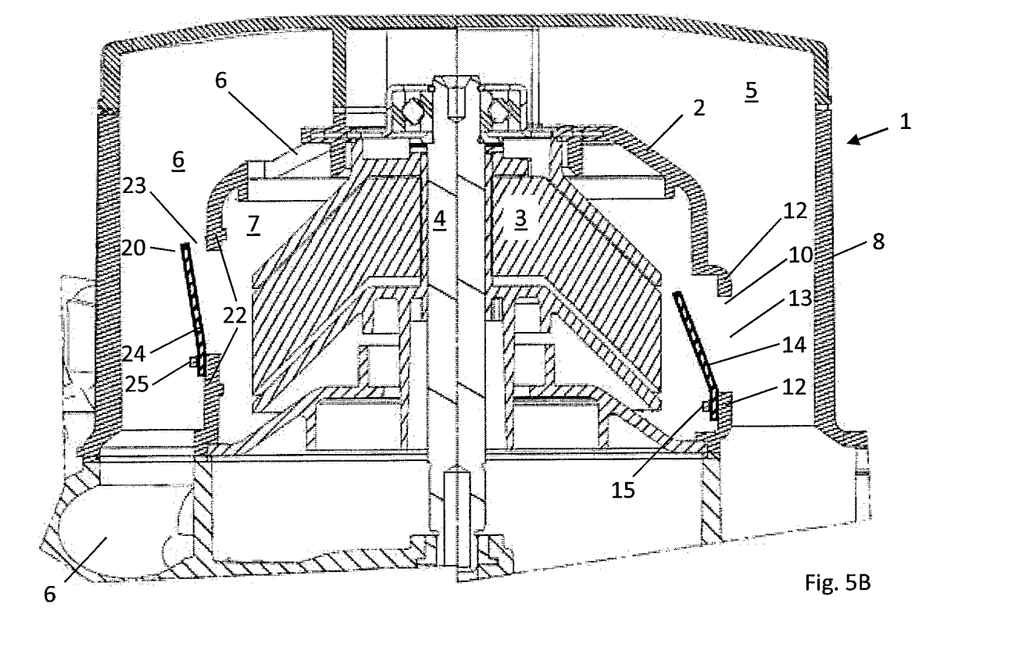

In two partial FIGS. 5A and 5B, FIG. 5 shows a further example of an oil separator 1 according to the invention, which is configured in the manner of the oil separator in FIG. 4. However, corresponding to FIG. 3, the housing 2 has a second outlet 20 in its wall, which is configured similarly as a valve in the same manner as the gas inlet 10. Only the opening direction is formed as in FIG. 3, i.e. the first valve 11 opens in the direction of the oil separating chamber 7 whilst the second valve 21 opens in the direction of the gas outlet 6 or the gas line mounted downstream of the gas outlet 6.

In FIG. 5B, the oil separator 1 is illustrated in the case of a high volume flow of the gas to be cleaned. Both valves 11 and 21 are open and enable a flow through the oil separating chamber without the corresponding volume flow being guided completely through the plate stack 3.

Instead of the spring tongues 14 which are used in FIGS. 4 and 5 and secured via a single holding arm, it is also possible to use a spring shim which is secured via two holding arms, as is disclosed for instance in DE 20 2014 006 149 U1, for example in FIGS. 1 and 2 It is likewise possible to use a valve shim which lifts away centrally, as is disclosed for instance in EP 1 743 110 A1 in FIG. 1. Further geometric configurations for this are revealed for instance in the figure group 15 of DE 20 2015 103 420.

In FIG. 3 and FIG. 5, the first valve 11 and the second valve 21 are each arranged opposite one another in the wall of the housing 2. In this case, the valves are slightly offset from one another in the axial direction of the shaft 4. However, an arrangement which is not offset or a non-opposite arrangement is also possible.

Figure 6:
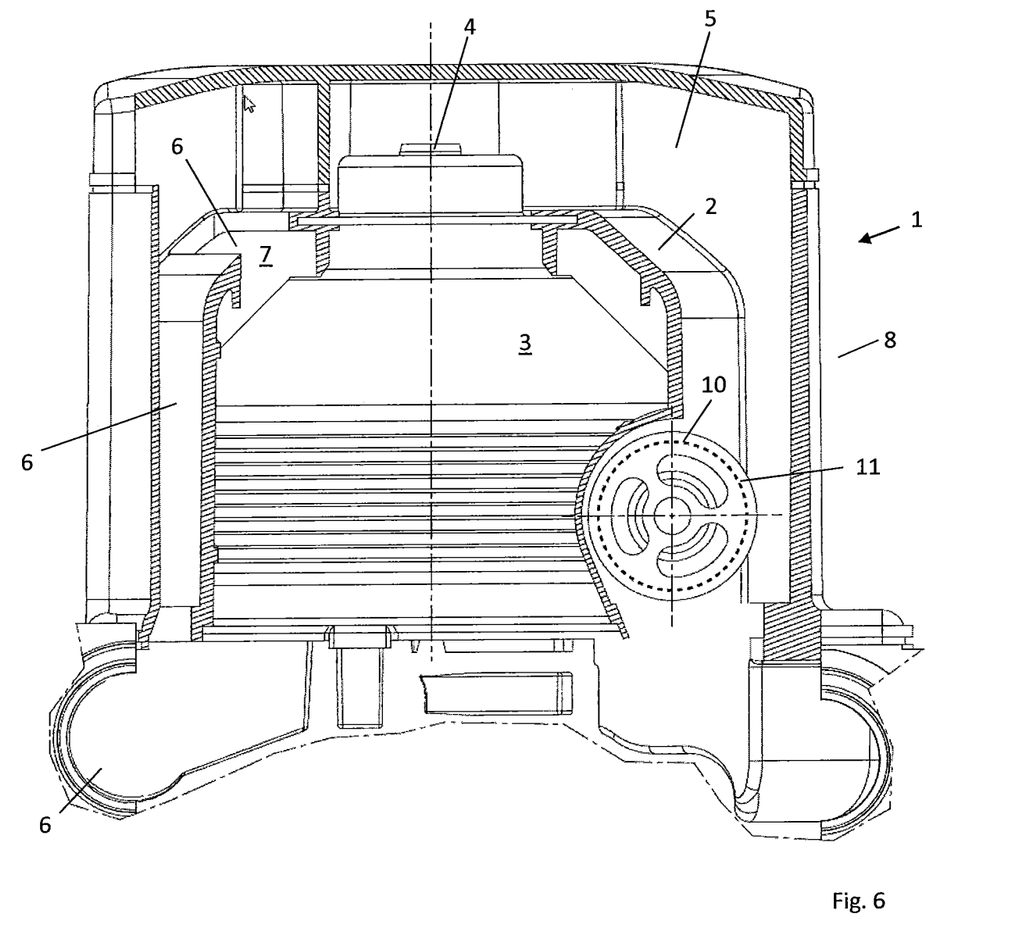

FIG. 6 shows a further oil separator 1 corresponding to that in FIG. 2. It is clear from this illustration that gas flowing through the second gas inlet flows substantially tangentially along the wall of the housing 2 into the oil separating chamber 7 and is therefore carried along immediately by the plate stack 3 or its surrounding gas flow. As a result of the tangential inflow, the rotational motion of the gas flowing in via the second gas inlet 10 is reinforced so that a further improved oil separation from this part of the gas flow is also realised. In the previous embodiments, the gas inlets of the oil separators likewise have at least one tangential inlet part relative to the turn of the housing 2.

Figure 7:
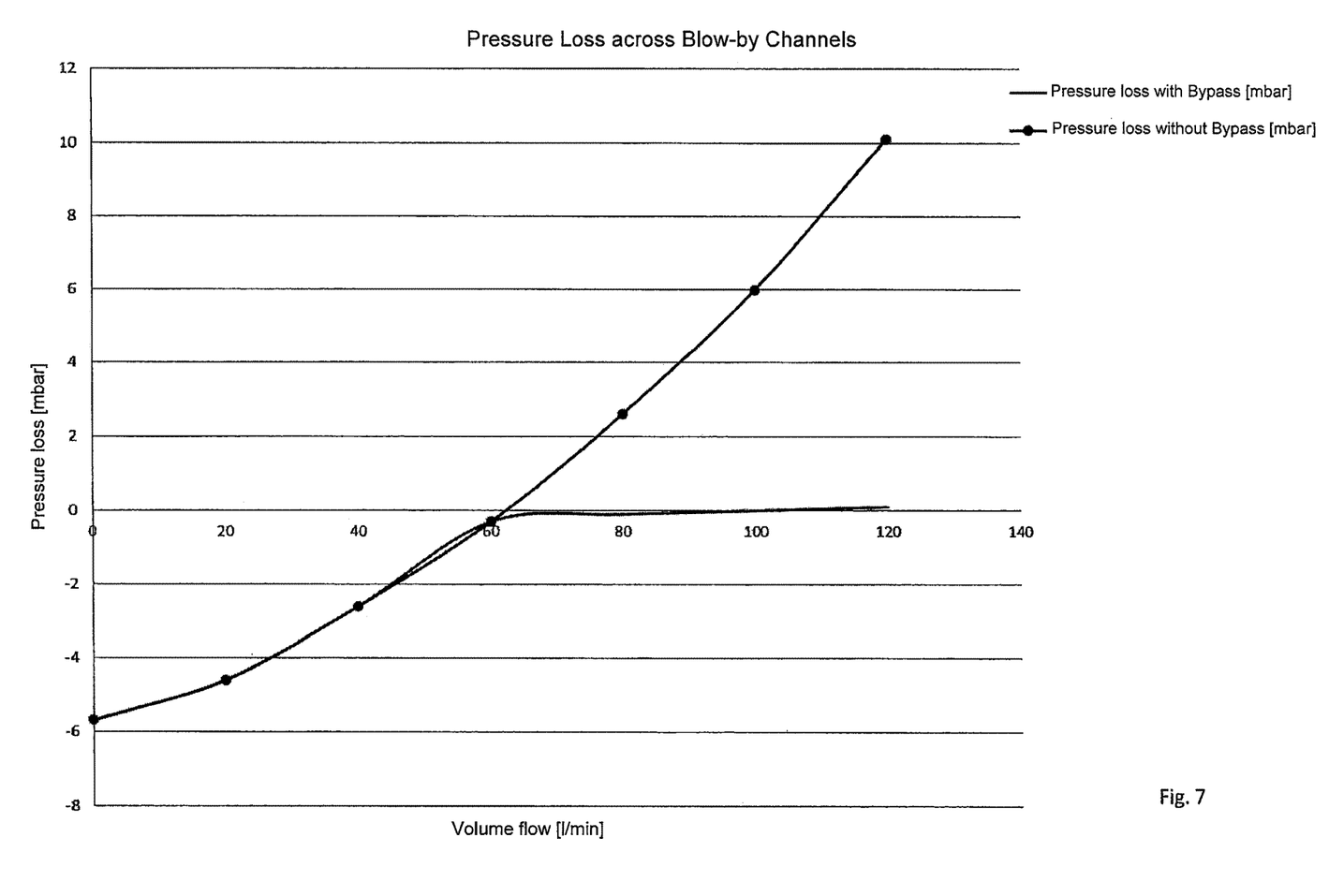
FIG. 7 the pressure loss across the blow-by channels of an internal combustion engine depending on the volume flow in a comparison between a conventional oil separator and an oil separator according to the present invention.

FIG. 7 now shows a comparison of the pressure loss depending on the volume flow between the gas inlet and the gas outlet. The line provided with black dots in this case shows the pressure loss in a conventional oil separator. The pressure loss continues to rise as the volume flow increases; in other words, this means that, with a given available pressure difference between the outlet and inlet side of the oil separator, the gas flow flowing through the oil separator is limited.

The curve illustrated without solid dots shows the pressure loss depending on the volume flow for an inventive oil separator according to FIG. 2. Owing to the arrangement of the additional second gas inlet, which is revealed as a bypass around the oil separating element, it is brought about that the pressure loss remains limited even as the volume flow of the gas to be cleaned continues to rise. In other words, with an available pressure difference between the outlet and inlet of the oil separator 1, it is also possible for a high volume flow to be conducted through the oil separator and at least fundamentally cleaned. In the case of the present oil separator according to the present invention, some of the gas to be cleaned is always conducted through the oil separating element 3 in this case and thereby cleaned substantially completely of oil mist and oil droplets. However, the gas to be cleaned which is not conducted through the oil separating element 3 is also accelerated in the oil separating chamber 7 and therefore substantially cleaned of oil mist and oil droplets, so that the gas flowing out of the oil separator 1 is, on the whole, also substantially cleaned in the case of high volume flows and/or a limited available pressure difference across the oil separator.

The invention claimed is:

1. An oil separator for separating oil droplets and/or oil mist from gases to be cleaned, comprising:
   a housing,
   a rotor, which has an oil separating element, arranged in the housing and spaced from the housing, and a shaft for rotatably mounting the oil separating element, a first gas inlet for supplying gases to be cleaned to the oil separating element along the shaft and
   a first gas outlet in the wall of the housing which surrounds the rotor,
   a second gas inlet for supplying gases to be cleaned is arranged in the wall of the housing which surrounds the rotor, and
   a second gas outlet in the wall of the housing which surrounds the rotor.

2. The oil separator according to claim 1, wherein the first gas inlet and the second gas inlet are connected to a common gas supply line outside or inside the housing.

3. The oil separator according to claim 1, wherein the second gas inlet is configured in such a way that through-flowing gas flows into the housing substantially tangentially along the wall of the housing.

4. The oil separator according to claim 1, wherein the second gas outlet is closed by a second valve, which is pre-loaded for a specified opening characteristic or is actively controllable, via a motor control or an actuator, selected from the group of a servomotor, an actuating element or a pressure sensor.

5. The oil separator according to claim 1, wherein the second inlet and the second outlet are arranged at opposite sides of the oil separating element.

6. The oil separator according to claim 1, wherein the second inlet and the second outlet are arranged adjacent or immediately adjacent to one another in the direction of rotation of the rotor, and/or the second inlet and the second outlet are arranged adjacent or immediately adjacent to one another perpendicularly to the direction of rotation of the rotor.

7. The oil separator according to claim 1, wherein the second inlet and the second outlet are arranged at the same height or offset from one another as viewed parallel to the axis of the shaft.

8. The oil separator according to claim 1, further comprising a drive element for driving the oil separating element of the rotor via the shaft.

9. The oil separator according to claim 8, wherein the drive element is a hydraulically driven drive element, selected from the group of a Heron turbine or a Pelton turbine.

10. The oil separator according to claim 8, wherein the drive element is an electrically driven drive element.

11. An oil separator for separating oil droplets and/or oil mist from gases to be cleaned, comprising:
   a housing,
   a rotor, which has an oil separating element, arranged in the housing and spaced from the housing, and a shaft for rotatably mounting the oil separating element, a first gas inlet for supplying gases to be cleaned to the oil separating element along the shaft and
   a first gas outlet in the wall of the housing which surrounds the rotor, and
   a second gas inlet for supplying gases to be cleaned is arranged in the wall of the housing which surrounds the rotor,
wherein the second gas inlet is closed by a first valve which is pre-loaded for a specified opening characteristic or is actively controllable, via a motor control or an actuator, selected from the group of a servomotor, an actuating element or a pressure sensor.

12. The oil separator according to claim 11, wherein the first valve opens the second gas inlet when a specified volume flow through the first gas inlet is exceeded and/or when a specified pressure difference between the gas on the pressure side of the first valve and the suction side of the first valve in the interior of the housing is exceeded.

13. An oil separator for separating oil droplets and/or oil mist from gases to be cleaned, comprising:
   a housing,
   a rotor, which has an oil separating element, arranged in the housing and spaced from the housing, and a shaft for rotatably mounting the oil separating element, a first gas inlet for supplying gases to be cleaned to the oil separating element along the shaft and
   a first gas outlet in the wall of the housing which surrounds the rotor, and
   a second gas inlet for supplying gases to be cleaned is arranged in the wall of the housing which surrounds the rotor,
wherein a first valve and/or a second valve each have a valve opening, a valve seat and a valve closure, wherein
   either the valve closure is formed as a movable spring tongue which covers the valve opening and, on the side facing the valve opening, is coated with an elastomer, with a closed-cell elastomer, at least in sections,
   or the valve is formed as a mushroom valve having a valve screen made of an elastomer material as said a valve closure.

* * * * *